United States Patent [19]
Cormier

[11] 3,726,327
[45] Apr. 10, 1973

[54] STAIR TREAD
[76] Inventor: Louis A. Cormier, 42 Central Street, Southbridge, Mass.
[22] Filed: Jan. 4, 1971
[21] Appl. No.: 103,743

Related U.S. Application Data

[62] Division of Ser. No. 778,365, Oct. 11, 1968, Pat. No. 3,552,084.

[52] U.S. Cl.................144/144.5, 33/174 G, 144/27
[51] Int. Cl..............................................B27c 5/10
[58] Field of Search.....................144/144.5, 144, 27; 33/174 G

[56] References Cited

UNITED STATES PATENTS

| | | | |
|---|---|---|---|
| 3,519,043 | 7/1970 | Guill | 144/144.5 |
| 995,454 | 6/1911 | Guptill | 144/144.5 |
| 3,559,704 | 2/1971 | Thompson | 144/144.5 |

*Primary Examiner*—Donald R. Schran
*Attorney*—Norman S. Blodgett

[57] ABSTRACT

This invention relates to a stair tread and, more particularly, to a system for remodeling new or renovating worn stair treads which involves routing a recess in the stair and placing an insert in the recess.

6 Claims, 9 Drawing Figures

LOUIS A. CORMIER
INVENTOR.

STAIR TREAD

REFERENCE TO CO-PENDING APPLICATIONS

This is a division of patent application Ser. No. 778,365 filed Oct. 11, 1968, now U.S. Pat. No. 3,552,081.

BACKGROUND OF THE INVENTION

One of the common problems that occurs in the renovation of buildings is that the replacement of worn stair treads is a very expensive operation. This is because it is not only necessary to remove the old stair tread but, at the same time, to remove mop boards and similar trim that rest on the outer ends of the stairs. Attempts to fill the worm spots in the stairs by use of filler materials have been unsuccessful because of the difficulty of bonding the filler material with the original stair tread material. These and other difficulties experienced with the prior art devices have been obviated in a novel manner by the present invention.

It is, therefore, an outstanding object of the invention to provide a stair tread having a selected surface which has good wearability, anti-slip characteristics, or the like.

Another object of this invention is the provision of a system for removating a stair tread which is inexpensive to carry out.

A further object of the present invention is the provision of a template and tool therefor for routing a recess in a stair tread for the renovation thereof.

It is another object of the instant invention to provide apparatus for the renovation of worn stair treads, which apparatus is simple and rugged in construction, inexpensive to manufacture and which is capable of a long life of useful service with a minimum of maintenance.

A still further object of the invention is the provision of a system for renovating a worn stair tread which is pleasing in appearance and which, in fact, improves the appearance of the stair over its original condition.

With these and other objects in view, as will be apparent to those skilled in the art, the invention resides in the combination of parts set forth in the specification and covered by the claims appended hereto.

SUMMARY OF THE INVENTION

In general, the present invention consists of a stair tread, having a main body with a flat upper surface, a recess of a predetermined plan shape formed in the upper surface, at least a portion of the recess opening onto the nose of the body and the remainder being undercut, and having an insert fastened into the recess and having an outwardly and downwardly flared edge for locking it into the undercut edge of the recess. More specifically, the bottom of the recess and the bottom of the insert are both flat and the thickness of the insert is slightly greater than the depth of the recess, so that the upper surface of the insert lies slightly higher than the upper surface of the tread. The edges of the recess and insert are formed with a vertical portion adjacent the upper surface of the tread and an angular portion adjacent the bottom of the recess. The apparatus for forming the recess consists of a template having an edge which is the shape of the desired recess and a flat surface extending away from the edge and a routing tool having a flange with a surface spaced a predetermined distance from the operating end of the tool and adapted to rest on the said flat surface during the generation of the recess. The cutter has a frusto-conical cutting edge for undercutting the recess in the inclined portion and an upper cylindrical portion for producing the vertical portion of the edge of the recess.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
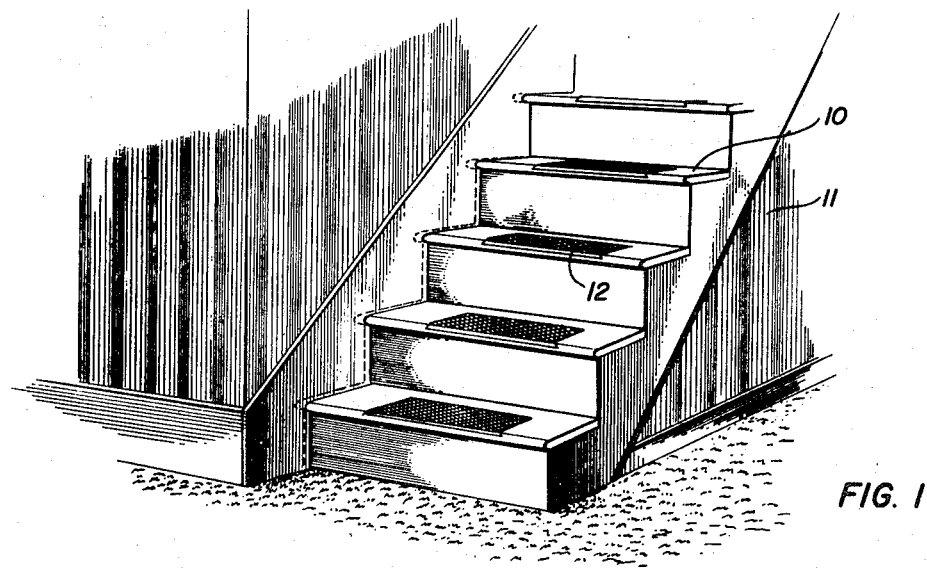
FIG. 1 is a perspective view of a stairway embodying the principles of the present invention.

Referring first to FIG. 1, which best shows the general features of the invention, the stair tread, indicated generally by reference numeral 10, is shown in use with a stairway 11 and having an insert 12.

Figure 2:
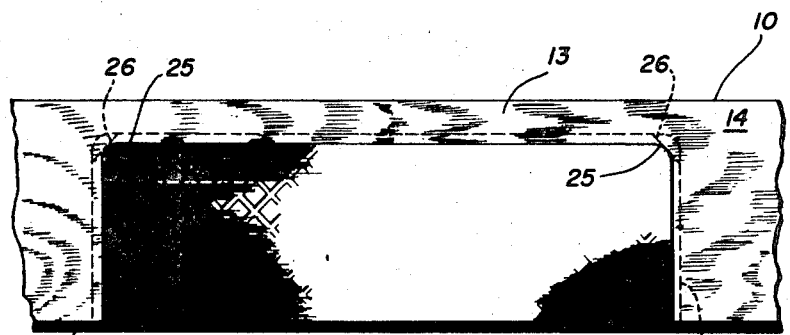
FIG. 2 is a plan view of a stair tread.
Figure 3:
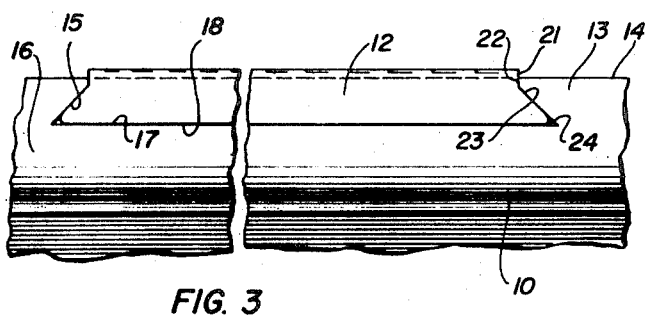
FIG. 3 is a front elevation of the stair tread.

In FIGS. 2 and 3, it can be seen that the stair tread 10 has a main body 13 with a flat upper surface 14. The surface has a recess 15 of rectangular shape. The recess has one side opening on the nose 16, while the other three sides are undercut. The insert 12 is fastened by cementing or the like in the recess and the insert has three outwardly-and-downwardly-flared edges which lock into the undercut edges of the recess. As is evident from the drawing, the bottom 17 of the recess and the bottom 18 of the insert are both flat. The thickness of the insert is slightly greater than the depth of the recess, so that the upper surface 19 of the insert lies slightly higher than the upper surface 14 of the main body 13 of the tread. The insert is, in the preferred embodiment, formed as an injection molding of a plastic, such as vinyl, and its upper surface may be configurated to give it a non-slip character. The insert material could also include metals, wood, plastic, or other composition materials.

The aforementioned flared three edges of the insert 12 are provided with an upper vertical portion 21 which lies against a similar upper vertical portion 22 and a lower inclined portion 23 which engages a similar lower inclined portion 24. The intersection of the portion 23 and the bottom 18 will have clearance. In FIG. 2 it can be seen that the intersections of the sides of the recess 12 are rounded at 25. If desired, the edge of the insert 12, which is exposed along the nose 16 of the tread, can be curved to match the nose surface, or may be of two-piece construction.

Figure 4:
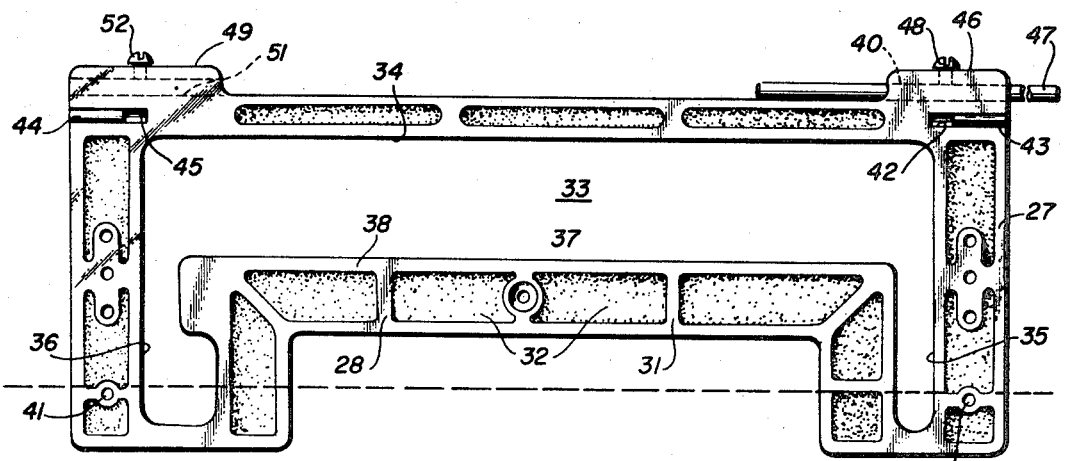
FIG. 4 is a plan view of a template.
Figure 5:
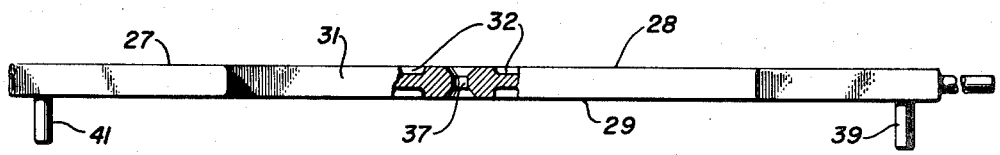
FIG. 5 is a front elevational view of the template.
Figure 6:
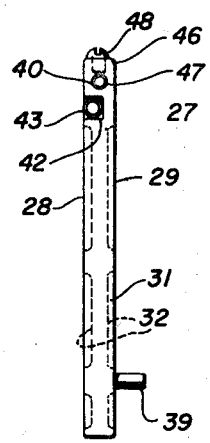
FIG. 6 is an end view of the template.

FIGS. 4, 5, and 6 illustrate a template 27 that can be used with a router tool and cutter to form the recess in the main body. The template is formed of a metal, such as aluminum, or composition materials in the shape of a rectangular frame 31 and is shaped with recesses 32 on its broad upper and lower surfaces 28 and 29. A large aperture 33 extends through the plate and has the same general shape as the recess. More specifically, the aperture has an elongated rectangular main portion 34 from one end of which extends at a right angle a leg 35 and from the other end of which extends a leg 36. The leg 35 has a uniform width along its entire length, but the leg 36 has that width only in the part closest to the main portion 34; further out from the main portion the leg 36 widens out to allow for initial cutter engagement. In its central portion, the plate has a fastening bore 37 which is countersunk on both sides. The upper surface 28 of the plate is provided with a continuous flat path 38 around the entire edge of the aperture 33, the plane of this path being located parallel to a similar path on the flat under surface 29 of the plate and accurately spaced therefrom. Extending from the under surface 29 and located beside the legs 35 and 36 are locating pegs 39 and 41, respectively. On the upper surface 28 and located at a corner of the plate away from the peg 39 is a recess 42 in which is hingedly mounted a locating peg 43; a similar locating peg 44 is hingedly mounted in a recess 45 at the corner opposite the peg 41. A protuberance 46 extends from the plate adjacent the peg 43 and has a bore 40 extending through it carrying a guide rod 47 which can be locked in position by a screw 48. At the other end of the plate, a similar protuberance 49 is provided with a bore 51 and a locking screw 52.

Figure 7:
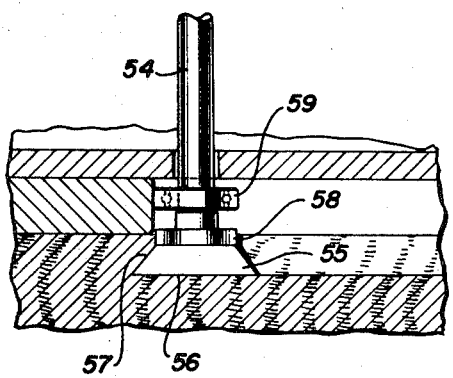
FIG. 7 is an elevational view of a routing tool.
Figure 8:
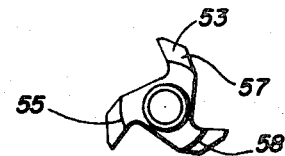
FIG. 8 is an end view of a routing tool.

FIGS. 7 and 8 show the details of a routing tool 53 for use with a router and the template 27 for forming the recess in the tread. The routing tool has an elongated stem 54 having one end adapted to be located in the chuck of a high-speed router of the conventional portable type. At the other end, the stem is provided with a cutter 55 having a flat bottom 56 lying at a right angle to the axis of the stem. Extending from the bottom is a frusto-conical cutting portion 57 from which extends a cylindrical cutting portion 58. Finally, a rolling guide 59 having an outer cylindrical surface of approximately the same diameter as the cylindrical cutting portion 58. The flange is formed as a ball bearing with the inner race locking on the stem of the tool and the outer race having the cylindrical guiding surface.

Figure 9:
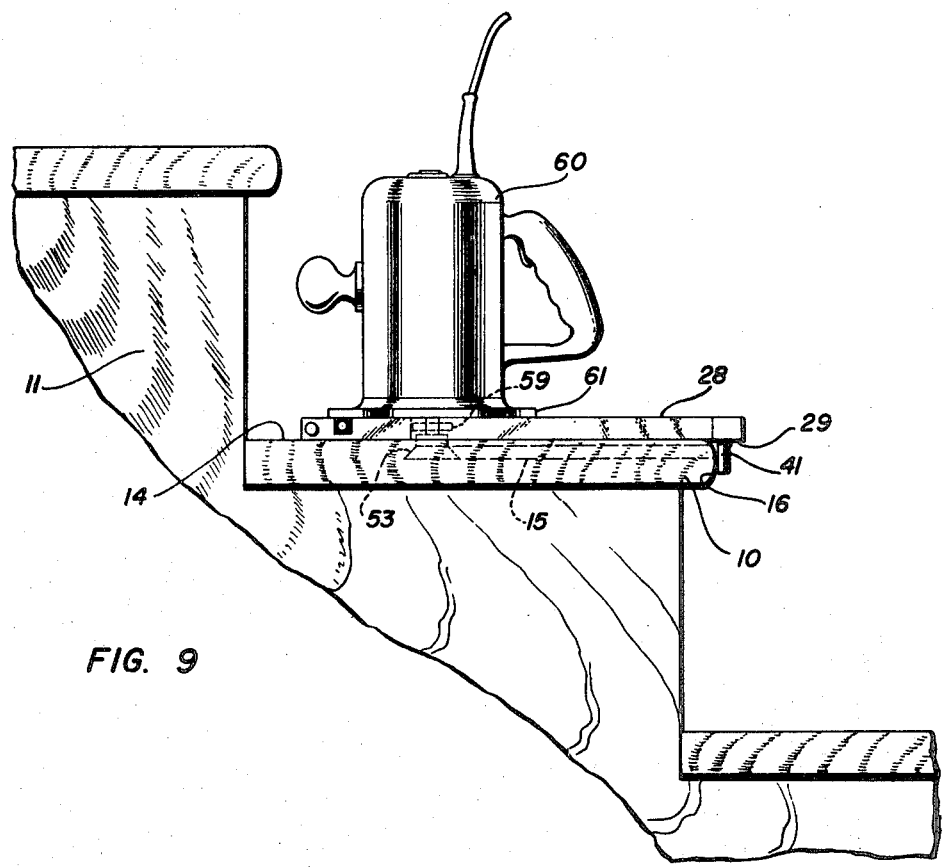
FIG. 9 is a side view of the stair showing the operation of the template and tool in forming a recess in a stair tread.

The operation of the apparatus will now be understood in view of the above description taken with FIGS. 7 and 9. Let us assume that the central portion of the stair tread 10 of the stairway 11 is worn, so that the stairway is dangerous and needs repair. The template 27 is laid on the main body 13 of the tread with its under surface 29 in contact with the upper surface 14 of the body. The template is slid rearwardly until both locating pegs 39 and 41 contact the nose 16 of the tread, the edge of which is shown as a dotted line in FIG. 4. The rod 47 contacts a vertical wall at the side of the stair and locates the template laterally. A flat-head wood screw is passed through the bore 37 in the plate and driven into the wood until its head lies in the countersink and the plate is tightly locked in place. The tool 53 is locked into the chuck of the portable router 60 to set depth with gage provided on template. The router and tool are moved vertically downwardly through opening 100 (starting position) until the guide flange 61 of the router rests on the upper surface 28 of the template. It will be understood in the initial entry of the routing tool into the opening 100, that the opening will lie entirely outside of the stair tread; this means that it is not necessary to start the rotation of the router until the router and tool are completely in place. The router is moved around in the aperture 33 until a recess 15 has been cut which is the shape of the aperture. Usually, the outline of the aperture would be routed out first by guiding the router and tool along the edge of the aperture. The guide flange 59 engages the edge in a frictionless manner. When the entire area below the aperture 33 has been routed out, the wood screw is removed and the locating pegs 43 and 44 are swung out of their recesses 42 and 45, respectively, to positions at right angles to the upper surface 28 of the template. The template is rolled over and laid on the stair with upper surface 28 facing downwardly and in contact with the upper surface 14 of the stair tread. The plate is pushed rearwardly until the locating pegs 43 and 44 contact the nose of the tread. The rod 47 contacts a vertical wall at the side of the stair and locates the template laterally, not only for the two operations on a given stair tread, but also for successive treads in a stairway. The wood screw is used to fasten the template in place and the router and tool are used to finish the formation of the recess. The template is then removed, the recess is cleaned out, and the insert 12 is slid into the recess from the opening onto the nose 16. A cement or adhesive is used to lock it in place.

It can be seen that this method of renovating a worn stair tread has many advantages. It is not necessary to remove and replace the tread itself; this results in a considerable cost saving, since the treads are quite expensive, replacing them requires considerable expensive labor, and in removing them damage is often done to the mop boards and moldings at the ends of the stairs. Often these moldings cover the ends of the treads and must be removed before the tread can be replaced.

The use of a recess 16 and insert with with a vertical portion 21 and 22 at the top of the edge obviates the possibility of splitting of the wood around the insert. Having the upper surface of the insert slightly above the upper surface of the main body of the tread is also helpful in this respect.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A template for use with a router for producing a recess in a stair tread to hold an insert, comprising:
   a. a frame having an under surface adapted to rest on the unrecessed portion of the stair tread, and an upper surface, the frame having an aperture which is coextensive with a portion of the recess when said frame is in a first position relative to the stair tread, and coextensive with at least the remainder of the recess when the frame is in a second position relative to the stair tread,
   b. first locating pegs operable to locate the frame in the first position, and c. second locating pegs operable to locate the frame in the second position.

2. A template as recited in claim 1, wherein the first locating pegs extend from the frame, and the second locating pegs extend from the frame in a direction opposite the first locating pegs.

3. A template as recited in claim 1, wherein the first locating pegs extend from the under surface, and the second locating pegs extend from the upper surface.

4. a template as recited in claim 1, wherein the under surface and the upper surface are parallel and the upper surface is adapted to rest on the unrecessed portion of the stair tread.

5. A template as recited in claim 1, wherein some of the locating pegs can easily be caused to no longer extend from the frame.

6. A template as recited in claim 1, wherein some of the pegs are hingedly mounted to the frame.

* * * * *